(12) United States Patent
Nagasaki

(10) Patent No.: US 6,431,767 B2
(45) Date of Patent: Aug. 13, 2002

(54) METHOD FOR PRODUCING A COUPLER BASED ON FIBER-FUSED CONNECTION

(76) Inventor: Hironobu Nagasaki, 3F Century Manoa, 2-chome 36-1, Denenchofu, Ota-ku, Tokyo (JP)

( * ) Notice: Subject to any disclaimer, the term of this patent is extended or adjusted under 35 U.S.C. 154(b) by 0 days.

(21) Appl. No.: 09/821,767

(22) Filed: Mar. 30, 2001

(51) Int. Cl.$^7$ .............................. G02B 6/38; G02B 6/255
(52) U.S. Cl. ........................................... 385/96; 385/51
(58) Field of Search .............................. 385/95, 96, 97, 385/98, 99, 100, 39, 51

(56) References Cited

U.S. PATENT DOCUMENTS

| | | | | |
|---|---|---|---|---|
| 5,054,868 A | * | 10/1991 | Hoban et al. | 385/99 |
| 5,627,930 A | * | 5/1997 | Ishiguro et al. | 385/51 |
| 5,802,224 A | * | 9/1998 | Okuta et al. | 385/51 |
| 2001/0017962 A1 | * | 8/2001 | Kim et al. | 385/43 |

FOREIGN PATENT DOCUMENTS

EP          1 056 170 A2  *  11/2000  ........... H01S/3/067

* cited by examiner

Primary Examiner—Brian Sircus
Assistant Examiner—Michael C. Zarroli
(74) Attorney, Agent, or Firm—Israel Gopstein, Esq.

(57) ABSTRACT

A method for producing a coupler based on fiber-fused connection enabling simple, rapid production of a coupler no matter how many optical fiber core lines may be involved or no matter how small their diameter may be, comprises placing a plurality of optical fiber cords 1, 2 in parallel which comprise optical fiber core lines 3, 4 covered with jackets 7, 8 with resilient fibers 5, 6 inserted between the periphery of the core lines and the jackets; cutting a specified point of the jacket of each optical fiber core line to divide the jacket into two limbs; sliding the divided limbs (9, 9' and 10, 10') of the jackets in opposite directions to expose thereby sections of the underlying optical fiber core lines, the exposed sections of optical fibers being brought into contact with each other, and heated to melt to form thereby a fusion-connected section 11; sliding back each jacket limb close to the fusion-connected section; and placing the fusion-connected section 11 together with the inward ends of jacket limbs in a protective case 12, a hardening resin 13 being introduced into the cavity within the protective case 12 to fill the cavity, and the resin being hardened to integrate the optical fiber cords with their connection within the protective case.

2 Claims, 8 Drawing Sheets

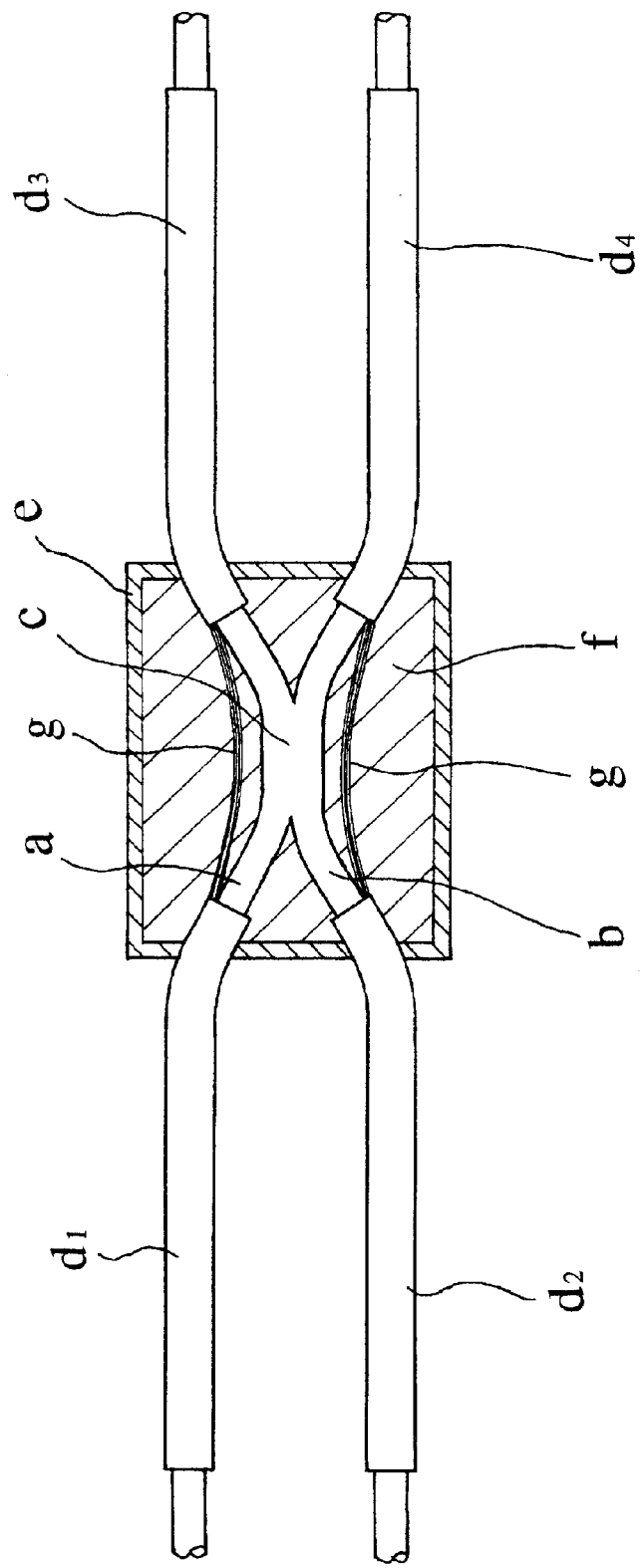

METHOD FOR PRODUCING A COUPLER BASED ON FIBER-FUSED CONNECTION

BACKGROUND OF THE INVENTION

1. Field of the Invention

The present invention relates to a method for producing a coupler based on fiber-fused connection.

2. Prior Art

Recently, with the increased spread of sophisticated communication systems, transmission systems based on optical fibers have been increasingly introduced for the connection of LANs and other networks to promote OA and FA.

In a LAN based on optical fibers, optical separators and couplers are more frequently used than before for distributing light signals to multiple terminals and for transmitting signals in the reverse direction.

The conventional optical separator/coupler mainly incorporates a coupler (star coupler) having multiple input terminals to serve as a key element of an optical data bus network. As this communication network enables a signal transmitted from any one terminal connected to the coupler to be distributed to the other terminals, its application becomes increasingly widened.

The coupler as described above is conventionally fabricated as follows. As shown in FIGS. 7 and 8, two optical fiber core lines (a) and (b) are closely placed together to bring their clads at the middle of their lengths in contact with each other; the contacted clads are heated to melt to form a fusion-connected section (c); jackets (d1), (d2), (d3) and (d4) are placed over both limbs of each of optical fiber core lines (a) and (b) being moved from their ends (a1), (b1), (a2) and (b2), respectively; the fusion-connected section (c) together with the four ends of jacket limbs close to it are placed in a protective case (e); a hardening resin (f) such as an epoxy resin is introduced into the cavity within the protective case (e) to fill the cavity; and, when the resin is hardened, a coupler integral with the optical fiber core lines is obtained.

Resilient fibers inserted longitudinally beneath the jackets (d1), (d2), (d3) and (d4) and over the periphery of optical fiber core lines (a) and (b) are represented by (g) in the figures.

However, with the conventional method for fabricating a coupler as described above, it is necessary, after a fused-connection is performed on optical fiber core lines to be coupled, to place tubular jackets over the limbs of the optical fiber core lines one after another while those lines have resilient fibers disposed around their peripheries. Therefore, fabrication based on the conventional method is poor in workability, produces too voluminous fusion-connected sections, and is high in cost.

Particularly when a coupler involving multiple, small-bore optical fiber core lines with correspondingly slender jackets is fabricated, the fabrication requires much labor and time, and often poses a problem in productivity. Moreover, a coupler produced by the conventional method, if it has to be sufficiently reinforced, becomes voluminous and expensive, while it becomes fragile when it is left small.

SUMMARY OF THE INVENTION

This invention was derived from an attempt to meet the above problems inherent to the conventional technique, and aims at providing a method for fabricating a fusion-connected coupler which enables simple, rapid production of a small, robust and inexpensive coupler in a highly productive manner.

To attain the above object, the method for fabricating a coupler according to this invention comprises the steps of placing a plurality of optical fiber cords in parallel, wherein each of the optical fiber cords comprises an optical fiber core line covered with a jacket with resilient fibers disposed longitudinally around the periphery of the core line beneath the jacket; making a cut on a specified point on the jacket of each optical fiber core line to divide the jacket into two limbs, and sliding the divided limbs of each jacket in opposite directions thereby to expose the middle section of the underlying optical fiber core line; bringing the exposed sections of optical core lines into contact with each other; heating the contacted sections to melt to form thereby a fusion-connected section; sliding back each jacket limb displaced outward close to the fusion-connected section; placing the fusion-connected section together with the cut ends of jacket limbs close to it in a protective case; introducing a hardening resin such as an epoxy resin into the cavity within the protective case to fill the cavity; and wherein, when the resin is hardened, the involved elements and their connection are integrated within the protective case.

BRIEF DESCRIPTION OF THE DRAWINGS

In the drawing.

FIG. 8 illustrates the final step of the production processes of FIG. 7.

DESCRIPTION OF THE PREFERRED EMBODIMENTS

The preferred embodiments of this invention will be detailed below with reference to the attached figures.

FIGS. 1 to 6 illustrate the processes for producing a fiber-fused coupler according to this invention.

Figure 1:
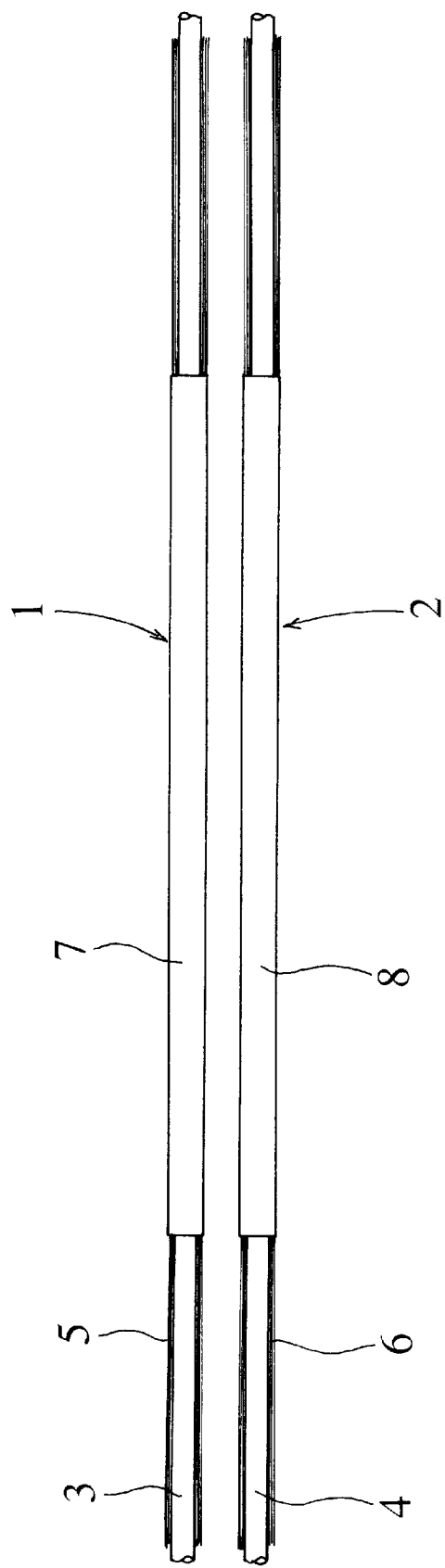
FIG. 1 illustrates the first step of the processes for producing a fusion-connected coupler according to the method of this invention.

Firstly, two optical fiber cords 1 and 2 comprising optical fiber core lines 3 and 4 having respective resilient fibers 5 and 6 running along their lengths and covered with jackets 7 and 8 are placed in parallel as shown in FIG. 1. In the figure, the jackets 7 and 8 have their ends cut to have a specified length, thereby to expose both the ends of optical fiber core lines 3 and 4 and of their resilient fibers 5 and 6.

Figure 2:
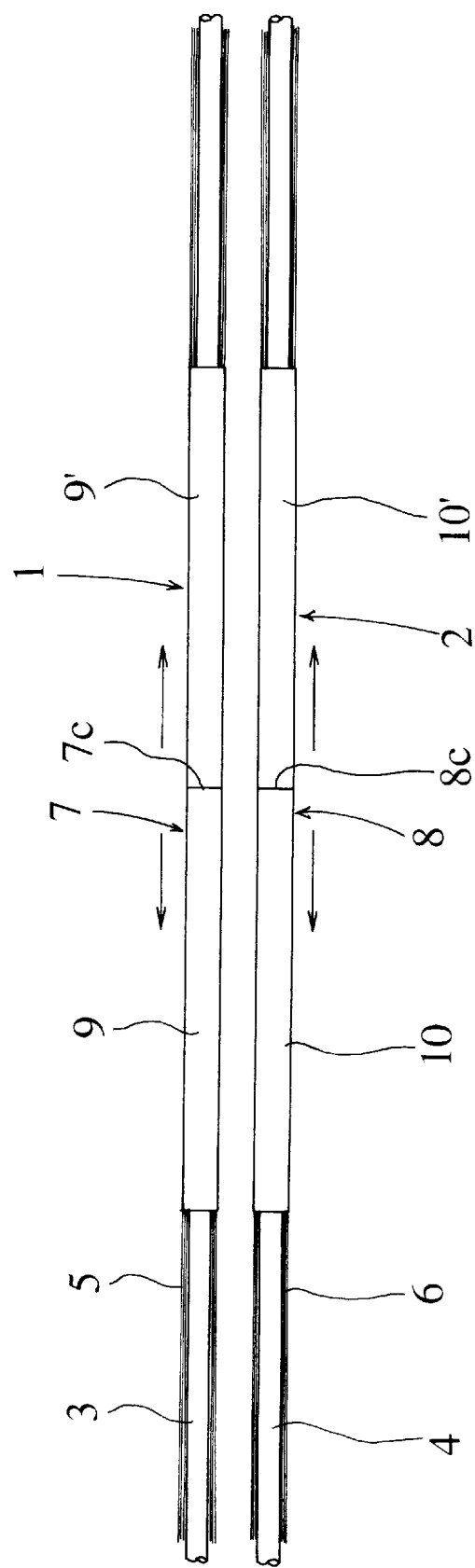
FIG. 2 illustrates the second step of the same production processes.
Figure 3:
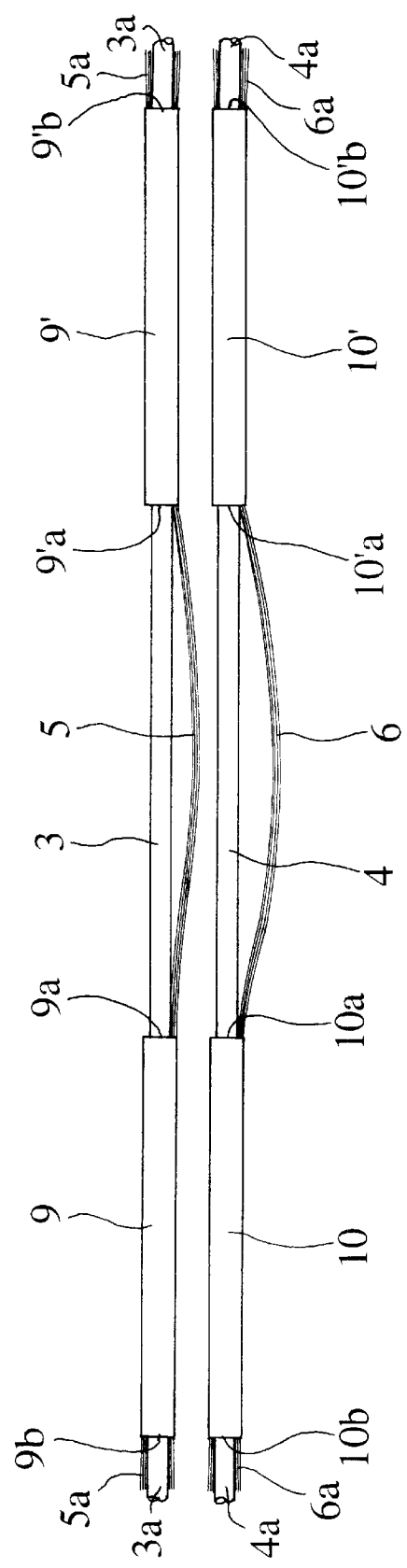
FIG. 3 illustrates the third step of the same production processes.

Next, as shown in FIGS. 2 and 3, the jackets 7 and 8 covering the optical fiber core lines 1 and 2 are cut at specified levels 7c and 8c at the middle of their lengths, to be divided into two limbs each; and the jacket limbs 9 and 9' and the jacket limbs 10 and 10' are slid in opposite directions such that the interval between the inward ends 9a and 9'a of jacket 9, and the interval between the inward ends 10a and 10'a of jacket 10 are sufficiently large to allow the work necessary for connection, and the outward ends 9b and 9'b and 10b and 10'b are positioned inwardly, by a sufficient length, of the outward ends (3a, 4a and 5a, 6a) of their respective optical fiber core lines 3,4 and resilient fibers 5,6.

As seen from above and from FIGS. 1 and 2, when jackets 7 and 8 are cut at levels 7c and 8c close to the middle, and the divided limbs of the jackets are separated by a specified distance, the outward ends 9b and 9'b of the limbs of jacket 7 and the outward ends 10b and 10'b of the limbs of jacket 8 are placed inward with respect to the ends (3a, 4a and 5a, 6a) of their respective optical fiber core lines (3,4) and resilient fibers (5,6), thus to expose the specific lengths of the both ends of optical fiber core lines 3, 4 and of resilient fibers 5,6.

Figure 4:
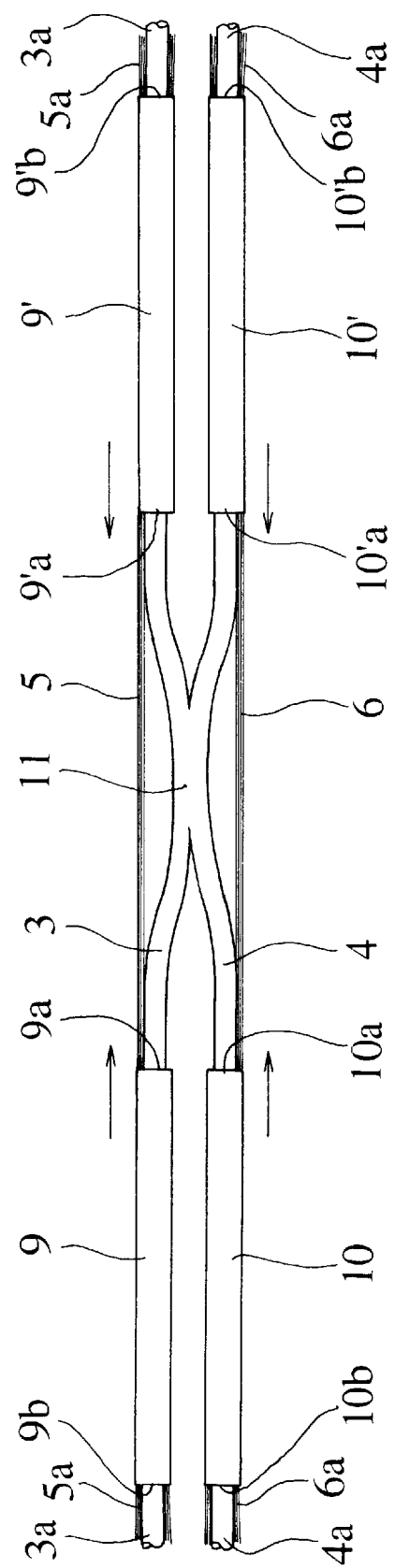
FIG. 4 illustrates the fourth step of the same production processes.
Figure 5:
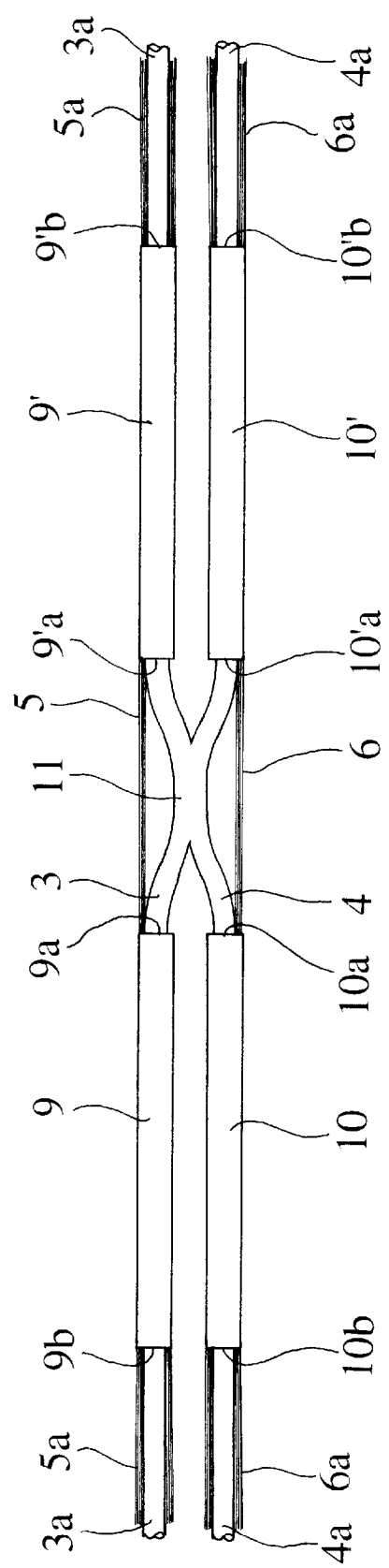
FIG. 5 illustrates the fifth step of the same production processes.

Then, the exposed mid-portions of optical fiber core lines 3 and 4 are brought into contact with each other as shown in FIGS. 4 and 5; the contacted portions are heated to melt to form thereby a fusion-connected section 11; and the separated jacket limbs 9 and 9' and 10 and 10' are slid back close to the fusion-connected section 11.

Figure 6:
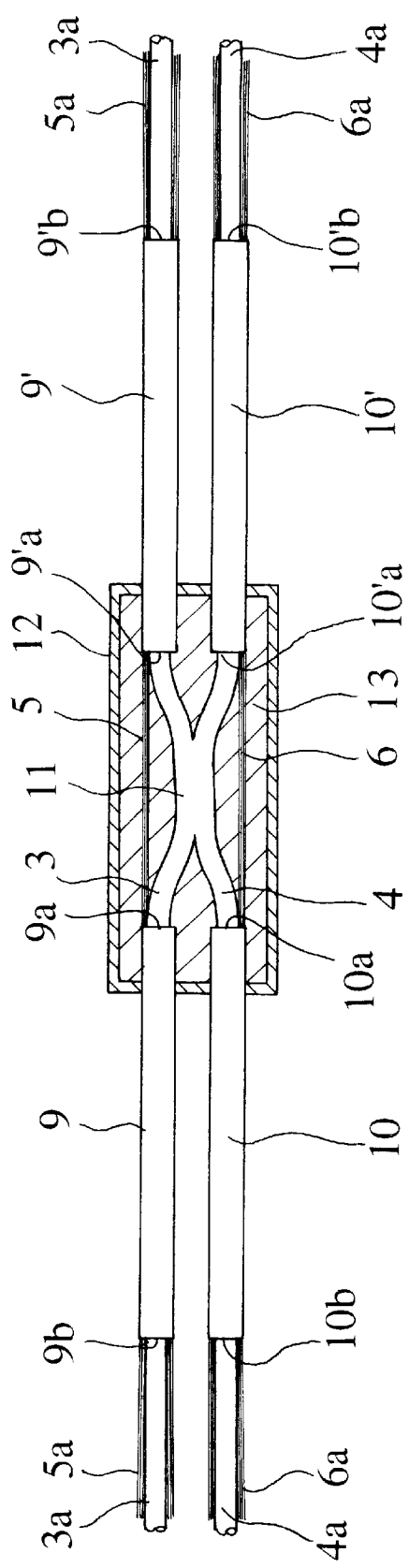
FIG. 6 illustrates the final step of the same production processes.
Figure 7:
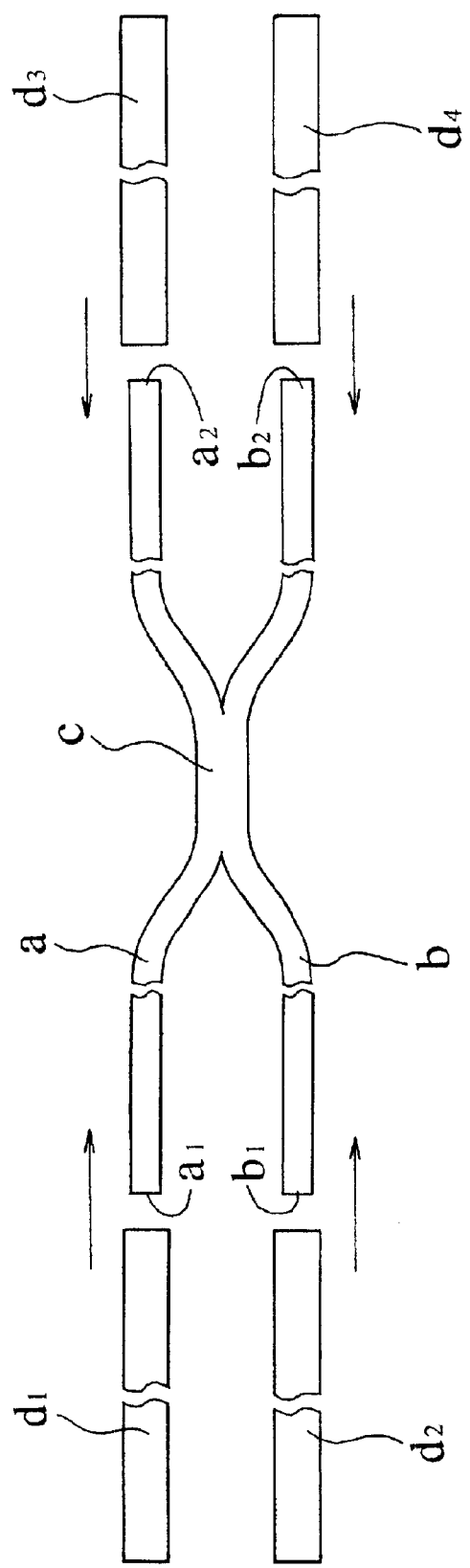
FIG. 7 illustrates the first step of the processes for producing a fusion-connected coupler according to a conventional method.

Next, the fusion-connected section 11 with the inward ends 9a and 9'a of jacket limbs 9 and 9', and the inward ends 10a and 10'a of jacket limbs 10 and 10' is placed in a protective case 12 as shown in FIG. 6; a hardening resin such as an epoxy resin 13 is introduced into the cavity within the protective case 12 to fill the cavity; and, when the resin hardens, the involved elements and their connection are integrated within the protective case 12.

The resilient fibers 5, 6 may be made of any material incorporated in a conventional optical fiber cord, such as aramid fiber, glass fiber, copper wire, PBO fiber, etc. The jacket 7, 8 may be made of a thermoplastic resin, thermosetting resin, UV-hardening resin, etc.

The above embodiment based on the method of this invention for producing a fiber-fused coupler involves connecting two optical fiber cables 1 and 2, but it may also involve connecting two optical fiber tape cords, instead of cables. Needless to say, the number of optical fiber cables or optical fiber tape cords to be connected is not limited to two, but may be three or more as desired.

The present invention has been described above, and will be briefly summarized as follows: a plurality of optical fiber cords are placed in parallel, each of which comprises an optical fiber core line covered with a jacket with resilient fibers inserted between the periphery of the core line and the jacket; a cut is made on a specified point of the jacket of each optical fiber core line to divide the jacket into two limbs, and the divided limbs of each jacket are moved in opposite directions to expose thereby a section of the underlying optical fiber core line; the exposed sections of the optical fibers are connected by fusion; each jacket limb displaced towards the outward end and kept there is slid back close to the fusion-connected section; the fusion-connected section together with the inward ends of the jacket limbs are placed in a protective case; and a hardening resin is hardened to integrate the involved elements and their connection. This method dispenses with the need for removal of the jacket from each optical fiber core line during the work for connection, no matter how many small-bore optical fiber core lines may be involved. Therefore, fabrication based on the method of this invention will reduce a loss involved in the labor and time required for completion of the product as compared with the conventional method, and will ensure such excellent productivity and workability as to enable the production of densely integrated, robust products.

What is claimed is:

1. A method for producing a coupler based on fiber-fused connection comprising the steps of:

placing a plurality of optical fiber cords in parallel each of which comprises an optical fiber core line with resilient fibers disposed around a periphery thereof, being collectively covered with a jacket;

cutting a specified point of the jacket of each optical fiber core line to divide the jacket into two limbs;

sliding the divided limbs of each jacket in opposite directions to expose thereby a section of the underlying optical fiber core line, the exposed sections of the optical fibers being brought into contact with each other, and the contacted sections being heated to melt to form thereby a fusion-connected section;

sliding back each jacket limb close to the fusion-connected section; and placing the fusion-connected section together with the inward ends of the jacket limbs in a protective case, a hardening resin being introduced into a cavity within the protective case to fill the cavity, and the resin being hardened thereby to position the optical fiber cords within the protective case.

2. The method recited in claim 1, wherein said hardening resin comprises an epoxy resin.

* * * * *

UNITED STATES PATENT AND TRADEMARK OFFICE
CERTIFICATE OF CORRECTION

PATENT NO. : 6,431,767 B2
DATED : August 13, 2002
INVENTOR(S) : Hironobu Nagasaki It is certified that error appears in the above-identified patent and that said Letters Patent is hereby corrected as shown below:

<u>Title page,</u>
Item [30], the following priority information should be added:

-- [30] Foreign Application Priority Data
May 15, 2000 [JP] Japan ………………..2000-142400 --

Signed and Sealed this

Nineteenth Day of November, 2002

*Attest:*

*Attesting Officer*

JAMES E. ROGAN
*Director of the United States Patent and Trademark Office*